United States Patent
Peacock et al.

(10) Patent No.: US 10,728,329 B2
(45) Date of Patent: Jul. 28, 2020

(54) SYSTEM AND METHODS FOR SECURE DATA STORAGE

(71) Applicant: Vivint, Inc., Provo, UT (US)

(72) Inventors: Alen Lynn Peacock, Orem, UT (US); Spencer Nugent, American Fork, UT (US); Clint Huson Gordon-Carroll, Highland, UT (US)

(73) Assignee: Vivint, Inc., Provo, UT (US)

( * ) Notice: Subject to any disclaimer, the term of this patent is extended or adjusted under 35 U.S.C. 154(b) by 102 days.

(21) Appl. No.: 15/358,995

(22) Filed: Nov. 22, 2016

(65) Prior Publication Data
US 2018/0146036 A1 May 24, 2018

(51) Int. Cl.
| | | |
|---|---|---|
| H04L 29/08 | (2006.01) | |
| H04L 12/28 | (2006.01) | |
| H04L 13/08 | (2006.01) | |
| H04L 12/861 | (2013.01) | |
| G06F 11/20 | (2006.01) | |

(52) U.S. Cl.
CPC ...... *H04L 67/1097* (2013.01); *G06F 11/2015* (2013.01); *H04L 12/2803* (2013.01); *H04L 13/08* (2013.01); *H04L 29/08801* (2013.01); *H04L 49/9063* (2013.01); *H04L 67/2842* (2013.01)

(58) Field of Classification Search
CPC ............... H04L 13/08; H04L 29/08549; H04L 29/08702; H04L 29/08729; H04L 29/08801; H04L 49/9063–9068; H04L 49/9084; H04L 49/9089; H04L 67/1095–1097; H04L 67/28; H04L 67/2842; H04L 12/2803; G06F 3/0601–0626; G06F 3/065; G06F 3/0655; G06F 3/067; G06F 11/2056–2097; G06F 11/2015; G06F 12/0868
See application file for complete search history.

(56) References Cited

U.S. PATENT DOCUMENTS

| | | | | |
|---|---|---|---|---|
| 6,546,422 | B1 * | 4/2003 | Isoyama | H04L 67/02 707/999.01 |
| 7,216,149 | B1 * | 5/2007 | Briscoe | G06F 11/3409 709/203 |
| 7,624,184 | B1 * | 11/2009 | Aviani | H04L 67/2819 709/212 |
| 8,392,384 | B1 * | 3/2013 | Wu | G06F 16/1748 707/693 |
| 8,776,137 | B2 | 7/2014 | Brandt et al. | |
| 9,326,028 | B2 | 4/2016 | Josephs et al. | |
| 2004/0177370 | A1 | 9/2004 | Dudkiewicz | |

(Continued)

OTHER PUBLICATIONS

"Router" Newton's Telecom Dictionary, 21st ed., Mar. 2005.*
"Ethernet", Newton's Telecom Dictionary, 21st ed., Mar. 2005.*

*Primary Examiner* — Brendan Y Higa
(74) *Attorney, Agent, or Firm* — Holland & Hart, LLP

(57) ABSTRACT

A computer-implemented method for secure data storage is described. In one embodiment, the method may include receiving data at a receiver. The method may further include integrating a storage device with the receiver, and storing the received data on the integrated storage device. The method may further include communicating the received data from the integrated storage device to be stored on a remote distributed storage network.

9 Claims, 6 Drawing Sheets

(56) References Cited

U.S. PATENT DOCUMENTS

| | | | |
|---|---|---|---|
| 2005/0144635 A1* | 6/2005 | Boortz | H04N 5/44543 |
| | | | 725/32 |
| 2008/0098470 A1* | 4/2008 | Danre | H04L 63/0853 |
| | | | 726/9 |
| 2008/0162741 A1* | 7/2008 | Christison | G06F 13/387 |
| | | | 710/18 |
| 2012/0166577 A1* | 6/2012 | Yoneyama | H04W 76/10 |
| | | | 709/217 |
| 2013/0185260 A1* | 7/2013 | Weinstein | H04L 67/1095 |
| | | | 707/646 |
| 2014/0189362 A1 | 7/2014 | Van Den Broeck et al. | |
| 2014/0317058 A1 | 10/2014 | Chang et al. | |
| 2014/0376530 A1* | 12/2014 | Erickson | H04W 40/02 |
| | | | 370/338 |
| 2017/0052513 A1* | 2/2017 | Raji | G06Q 30/02 |

* cited by examiner

SYSTEM AND METHODS FOR SECURE DATA STORAGE

BACKGROUND

The present disclosure, for example, relates to systems and methods for secure data storage, and more particularly to facilitating data storage at both a local receiver and at a remote distributed storage network.

Advancements in media delivery systems and media-related technologies continue to increase at a rapid pace. Increasing demand for media has influenced the advances made to media-related technologies. Computer systems have increasingly become an integral part of the media-related technologies. Computer systems may be used to carry out several media-related functions. The widespread access to media has been accelerated by the increased use of computer networks, including the Internet and cloud networking.

Many businesses use one or more computer networks to deliver media between the various computers connected to the networks. Users of computer technologies continue to demand increased access to media and an increase in the efficiency of these technologies.

With the wide-spread use of computers and mobile devices has come an increased need for secure data storage. Local data storage may be compromised, however, in the event of a device being unplugged or reset.

SUMMARY

Existing receivers, such as set top boxes or routers, may allow for local data storage, for example storing media locally on the receiver. However, such localized storage may be compromised should the receiver require unplugging or resetting, or in the event of damage to or theft of the receiver. Some solutions may include attaching backup storage to the receiver, such as an external hard drive. Again, however, the stored data is at risk of loss in the event of system malfunction, theft, or damage.

In one embodiment, a computer-implemented method for secure data storage is described. In one embodiment, the method may include receiving data at a receiver. The method may further include integrating a storage device with the receiver, and storing the received data on the integrated storage device. In any embodiment, the method may further include communicating the received data from the integrated storage device to be stored on a remote distributed storage network.

In some embodiments, integrating the storage device with the receiver may include integrating the storage device with the receiver in a single housing.

In some embodiments, integrating the storage device with the receiver may include coupling the storage device to the receiver. In some embodiments, the storage device may be independently housed from the receiver. In some embodiments, the coupling may include at least one of snapping, or plugging, or mechanically attaching the storage device to the receiver, or any combinations thereof.

In some embodiments, the receiver may include a router.

In some embodiments, the receiver may include a set top box.

In some embodiments, receiving data at the receiver may include receiving at least one of channel preferences, or recorded video, or user settings, or combinations thereof.

In some embodiments, the remote distributed storage network may include a cloud storage network.

The present invention is also directed to an apparatus for secure data storage. In some embodiments, the apparatus may include a processor, a receiver, a storage device integrated with the receiver, and memory in electronic communication with the processor. In some embodiments, instructions may be stored in the memory, and the instructions may be executable by the processor to receive data at the receiver. In some embodiments, the instructions may be further executable by the processor to store the received data on the integrated storage device. In some embodiments, the instructions may be further executable by the processor to communicate the received data from the integrated storage device to be stored on a remote distributed storage network.

The present invention is also directed to a non-transitory computer-readable medium storing computer executable code. In some embodiments, the code may be executable by a processor to receive data at a receiver. In some embodiments, the storage device may be integrated with the receiver. In some embodiments, the code may be further executable by the processor to store the received data on the integrated storage device. In some embodiments, the code may be further executable by the processor to communicate the received data from the integrated storage device to be stored on a remote distributed storage network.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

The systems and methods described herein relate to providing secure local and cloud-based data storage by integrating a storage device with a receiver, such as a set top box or a router. Typical receiver storage may be limited to local data storage, and may therefore be susceptible to loss. By contrast, the ability to store data both locally at the receiver and remotely on a distributed storage network allows for security and consistency in data storage and transfer.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

Figure 1:
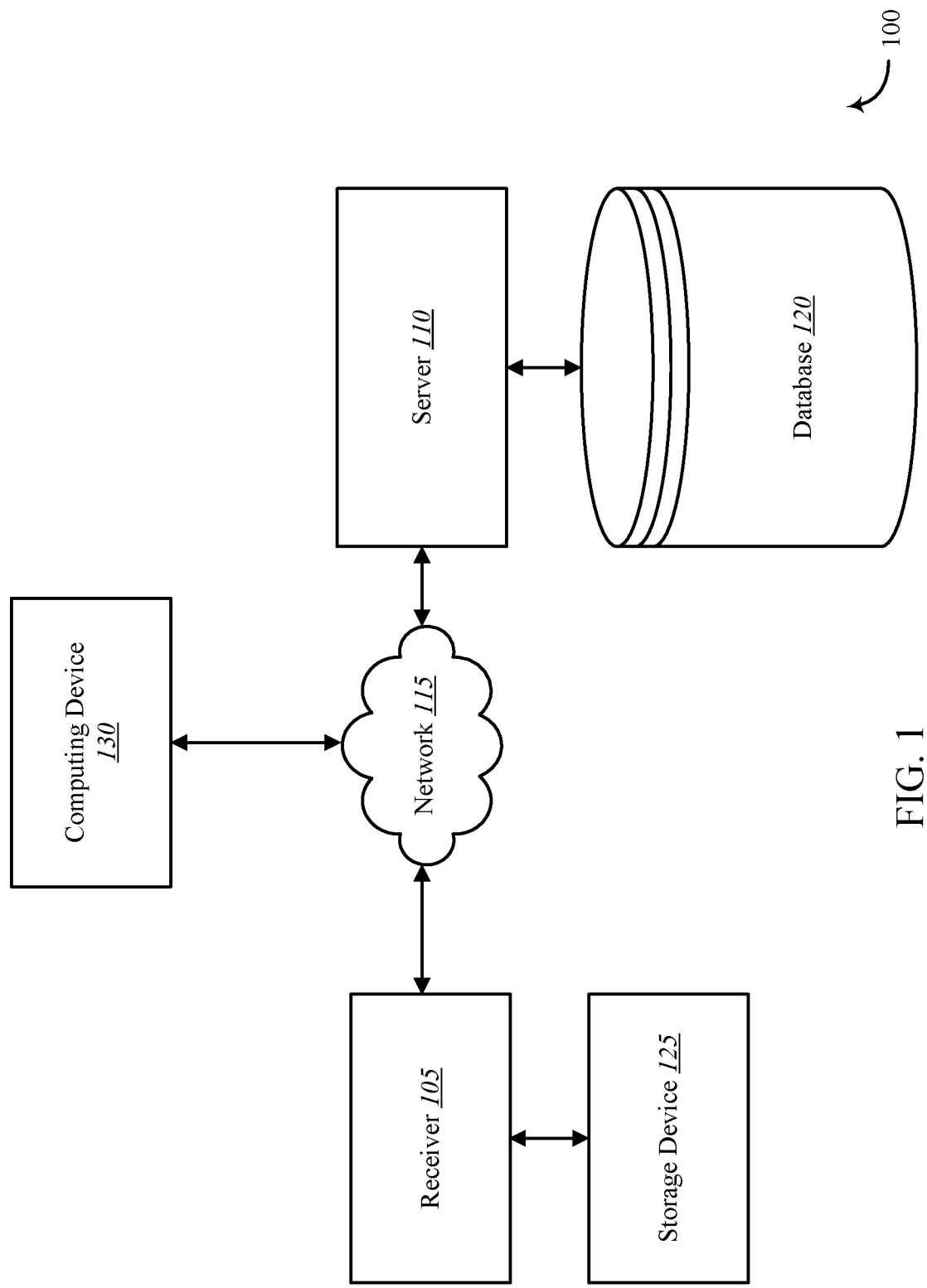
FIG. 1 is a block diagram illustrating one embodiment of an environment in which the present systems and methods may be implemented.

FIG. 1 is a block diagram illustrating one embodiment of an environment 100 in which the present systems and methods may be implemented. In some embodiments, the systems and methods described herein may be performed on a receiver (e.g., receiver 105). The environment 100 may include a receiver 105, server 110, a storage device 125, a computing device 130, a database 120, and a network 115 that allows the receiver 105, the server 110, the computing device 130, and the storage device 125 to communicate. Examples of the receiver 105 include media content set top boxes, satellite set top boxes, cable set top boxes, DVRs, personal video recorders (PVRs), mobile devices, smart phones, personal computing devices, computers, servers, routers, etc. Storage device 125 may be an external hard drive, having a wireless or wired connection with network 115. Storage device 125 may be integrated with receiver 105. In some embodiments, storage device 125 may be integrated within receiver 105 during manufacturing; in other embodiments, storage device 125 may be coupled with receiver 105 via a wired connection, such as via an Ethernet cable; in still other embodiments, storage device 125 may be mechanically coupled with receiver 105, such as by a plug, snap, insertion into a slot, or the like.

In some embodiments, receiver 105 may communicate with server 110 via network 115. Example of networks 115 include cloud networks, local area networks (LAN), wide area networks (WAN), virtual private networks (VPN), wireless networks (using 802.11, for example), cellular networks (using 3G and/or LTE, for example), etc. In some configurations, the network 115 may include the Internet. In some embodiments, functionality of receiver 105 may be accessed locally at receiver 105, while in other embodiments, a user may access the functions of receiver 105 from computing device 130. For example, in some embodiments, computing device 130 includes a mobile application that interfaces with one or more functions of receiver 105 and/or server 110.

In some embodiments, the server 110 may be coupled to database 120. For example, receiver 105 may access program content 150 in database 120 over the network 115 via server 110. Database 120 may be internal or external to the server 110. In one example, the receiver 105 may be coupled to database 120 via network 115.

Figure 2:
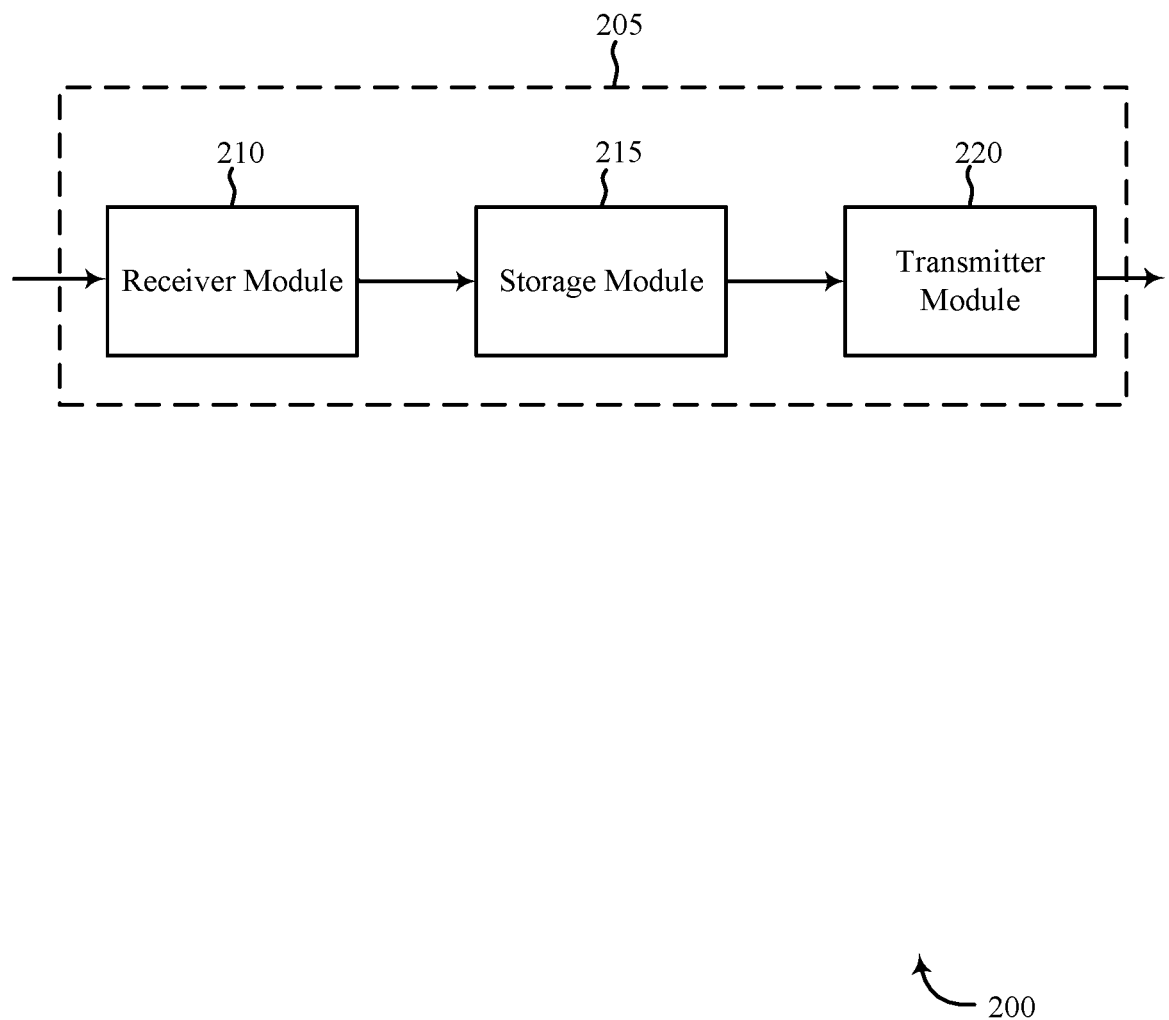
FIG. 2 shows a block diagram of a device relating to a secure data storage system, in accordance with various aspects of this disclosure.

FIG. 2 shows a block diagram 200 of an apparatus 205 for use in secure data storage systems, in accordance with various aspects of this disclosure. The apparatus 205 may be, in some embodiments, an example of one or more aspects of a receiver 105. The apparatus 205 may include any of a receiver module 210, storage module 215, and/or a transmitter module 220. The apparatus 205 may also be or include a processor. Each of these modules may be in communication with each other—directly and/or indirectly.

The components of the apparatus 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 210 may receive information such as packets, user data, and/or control information associated with various information channels (e.g., control channels, data channels, etc.). For example, receiver module 210 may receive channel preferences, recorded video, or user settings associated with a set top box or other user television or computer networking device. In other examples, receiver module 210 may receive data associated with Internet data packets. In some embodiments, data received at receiver module 210 may originate from a computing device, such as computing device 130 described with respect to FIG. 1. In other examples, data received at receiver module 210 may be communicated from a remote server or database, such as server 110 or database 120, via a network such as network 115, as described in more detail with respect to FIG. 1.

The data received at receiver module 210 may then be communicated to storage module 215. Storage module 215 may store the received data locally at apparatus 205. For example, where apparatus is an example of a set top box, storage module 215 may store channel preferences, recorded video, user settings, or the like. In other examples, where apparatus 2015 is an example of a router, storage module 215 may store data packets associated with Internet traffic directed through the router.

Data received at receiver module 210 and saved by storage module 215 may also be communicated to transmitter module 220. Transmitter module 220 may communicate the received data to a remote distributed storage network, such as network 115 as described in FIG. 1. For example, transmitter module 220 may communicate saved user data or recorded video from a set top box to a remote distributed storage network, such as a cloud storage network. In this way, data received at receiver module 210 may be saved locally at apparatus 205, and may be saved remotely on a remote distributed storage network.

In any embodiment, data stored on the remote distributed storage network may be accessible to a user via apparatus 205, or via any local or remote computing device, such as a smartphone or personal computer. This may facilitate access to saved videos or other user data, even at locations remote from apparatus 205. Such remote storage may also provide secure backup storage in the event of damage, reset, or theft of apparatus 205.

Figure 3:
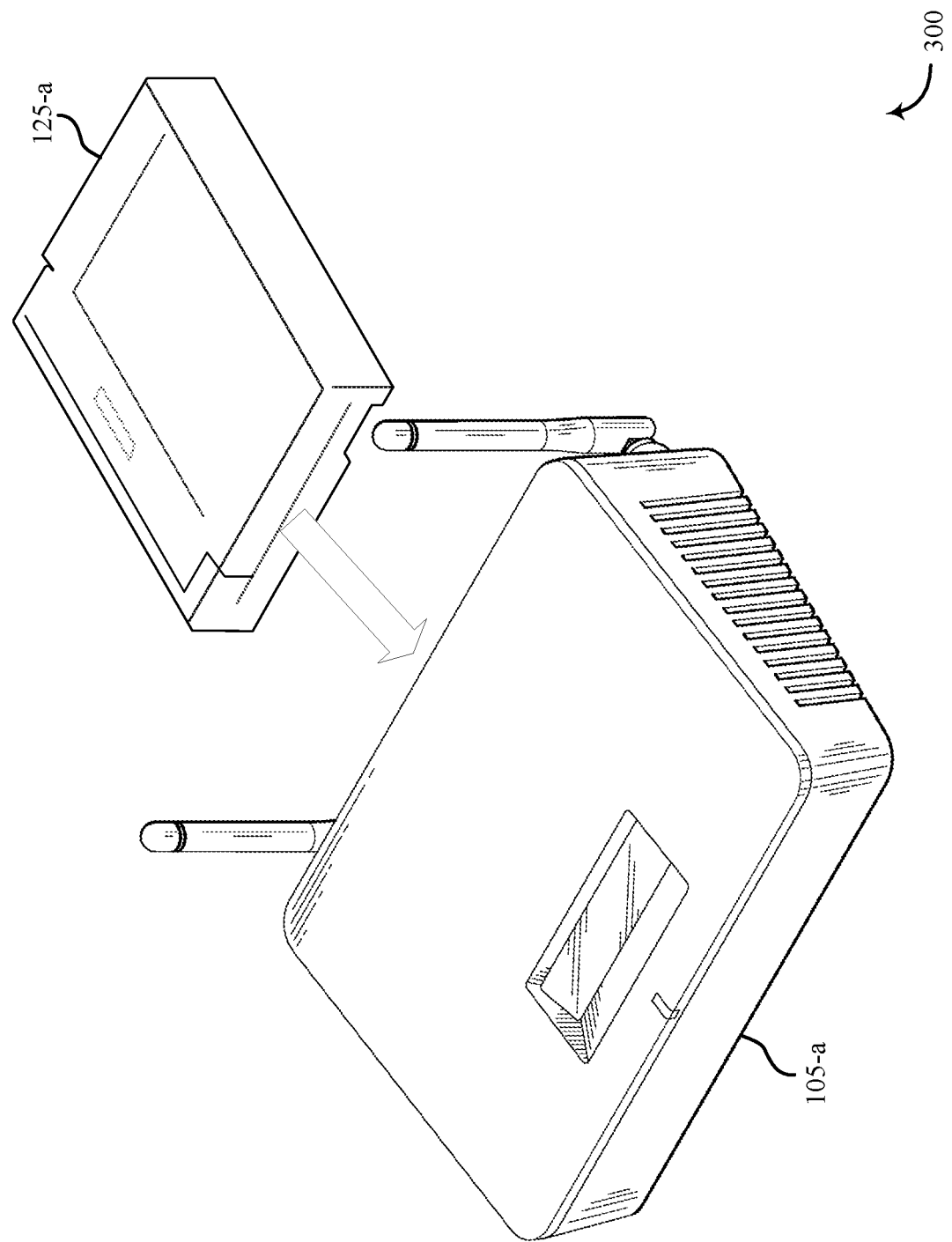
FIG. 3 depicts a device relating to a secure data storage system, in accordance with various aspects of this disclosure.

FIG. 3 depicts a device relating to a secure data storage system, in accordance with various examples. In order to effect secure data storage both locally and on a remote distributed storage network, a storage device 125-a may be integrated with a receiver 105-a, which may be examples of storage device 125 and receiver 105, respectively, as described with reference to FIG. 1. In the illustrated example, storage device 125-a may be integrated with receiver 105-a by inserting storage device 125-a into a designated slot in receiver 105-a. This configuration may be advantageous for post-manufacturing integration of the storage device 125-a with a receiver 105-a, and may facilitate substitution of different receivers for use with the same storage device 125-a, as desired by a user. This configuration may be additionally advantageous in providing independent power sources for each of the storage device 125-a and receiver 105-a, such that a loss of power or reset of receiver 105-a may not impact operation of storage device 125-a.

Although illustrated in FIG. 3 as insertion of storage device 125-a into a slot in receiver 105-a, in other embodiments, alternate post-manufacturing coupling may be utilized. For example, storage device 125-a may be plugged into a coupling apparatus associated with receiver 105-a, such as a docking configuration; may be snapped onto receiver 105-a; or may be otherwise mechanically and removably coupled with receiver 105-a.

In other embodiments, storage device 125-a may be integrated with the receiver 105-a by manufacturing storage device 125-a as an integral component of receiver 105-a. In such an embodiment, storage device 125-a and receiver 105-a may share a common power source, such as an external plug or internal battery. This configuration may be desirable in instances where a single apparatus may be preferable for users seeking ease of purchase, set-up, and use. However, such embodiment may result in loss of power to the storage device 125-a in the event that the receiver 105-a is unplugged or otherwise disassociated with a power source.

In other embodiments, storage device 125-a may be integrated with the receiver 105-a by a wired connection, such as through an Ethernet port connection between the two apparatuses. In such configuration, storage device 125-a and receiver 105-a may share a common power source in some embodiments, or may utilize independent power sources in other embodiments.

Figure 4:
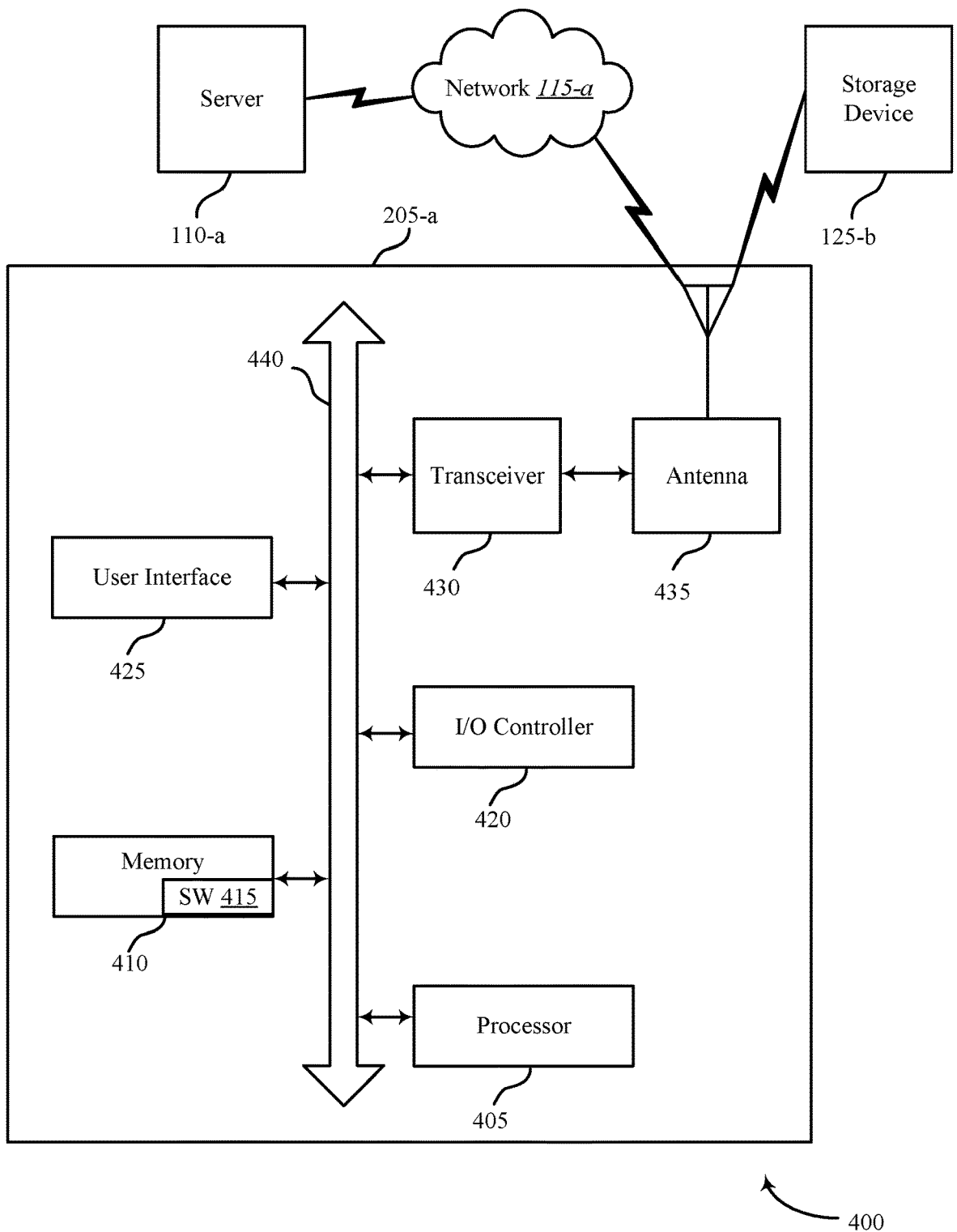
FIG. 4 is a block diagram illustrating one example of a secure data storage system, in accordance with various aspects of this disclosure.

FIG. 4 shows a system 400 for use in secure data storage, in accordance with various examples. System 400 may include an apparatus 205-a, which may be an example of the receiver 105, 105-a of FIGS. 1 and 3. Apparatus 205-a may also be an example of one or more aspects of apparatus 205 of FIG. 2.

Apparatus 205-a may include components for bi-directional data communications including components for transmitting communications and components for receiving communications. For example, apparatus 205-a may communicate data received from server 110-a via network 115-a in some examples, and may communicate that received data to storage device 125-b. In other examples, apparatus 205-a may receive data from a local computing device or media device, such as a television, and may store such received data locally at apparatus 205-a, as well as communicate that received data to storage device 125-b. This bi-directional communication may be direct (e.g., apparatus 205-a communicating directly with storage device 125-b) or indirect (e.g., apparatus 205-a communicating with server 110-a via network 115-a). Server 110-a, network 115-a, and storage device 125-b may be examples of server 110, network 115, and storage device 125, 125-a as shown with respect to FIGS. 1 and 3.

Apparatus 205-a may include a processor module 405, and a memory 410 (including software (SW) 415), an input/output controller module 420, a user interface module 425, a transceiver module 430, and one or more antennas 435, each of which may communicate—directly or indirectly—with one another (e.g., via one or more buses 440). The transceiver module 430 may communicate bi-directionally—via the one or more antennas 435, wired links, and/or wireless links—with one or more networks or remote devices as described above. For example, the transceiver module 430 may communicate bi-directionally with one or more of server 110-a or storage device 125-b. The transceiver module 430 may include a modem to modulate the packets and provide the modulated packets to the one or more antennas 435 for transmission, and to demodulate packets received from the one or more antennas 435. While an apparatus comprising a control panel (e.g., 205-b) may include a single antenna 435, the apparatus may also have multiple antennas 435 capable of concurrently transmitting or receiving multiple wired and/or wireless transmissions. In some embodiments, one element of apparatus 205-a (e.g., one or more antennas 435, transceiver module 430, etc.) may provide a direct connection to a remote server 110-a via a direct network link to the Internet via a POP (point of presence). In some embodiments, one element of apparatus 205-a (e.g., one or more antennas 435, transceiver module 430, etc.) may provide a connection using wireless techniques, including digital cellular telephone connection, Cellular Digital Packet Data (CDPD) connection, digital satellite data connection, and/or another connection.

The signals associated with system 400 may include wireless communication signals such as radio frequency, electromagnetics, local area network (LAN), wide area network (WAN), virtual private network (VPN), wireless network (using 802.11, for example), 345 MHz, Z Wave, cellular network (using 3G and/or LTE, for example), and/or other signals. The one or more antennas 435 and/or transceiver module 430 may include or be related to, but are not limited to, WWAN (GSM, CDMA, and WCDMA), WLAN (including Bluetooth and Wi-Fi), WMAN (WiMAX), antennas for mobile communications, antennas for Wireless Personal Area Network (WPAN) applications (including RFID and UWB). In some embodiments each antenna 435 may receive signals or information specific and/or exclusive to itself. In other embodiments each antenna 435 may receive signals or information neither specific nor exclusive to itself.

In some embodiments, the user interface module 425 may include an audio device, such as an external speaker system, an external display device such as a display screen, and/or an input device (e.g., remote control device interfaced with the user interface module 425 directly and/or through I/O controller module 420).

One or more buses 440 may allow data communication between one or more elements of apparatus 205-a (e.g., processor module 405, memory 410, I/O controller module 420, user interface module 425, etc.).

The memory 410 may include random access memory (RAM), read only memory (ROM), flash RAM, and/or other types. The memory 410 may store computer-readable, computer-executable software/firmware code 415 including instructions that, when executed, cause the processor module 405 to perform various functions described in this disclosure (e.g., receive data associated with the functionality of the router or set top box, store the data locally at apparatus 205-a, communicate the data to storage device 125-b to be stored on a remote distributed storage network, etc.). Alternatively, the software/firmware code 415 may not be directly executable by the processor module 405 but may cause a computer (e.g., when compiled and executed) to perform functions described herein.

In some embodiments the processor module 405 may include, among other things, an intelligent hardware device (e.g., a central processing unit (CPU), a microcontroller, and/or an ASIC, etc.). The memory 410 may contain, among other things, the Basic Input-Output system (BIOS) which may control basic hardware and/or software operation such as the interaction with peripheral components or devices. Applications resident with system 400 are generally stored on and accessed via a non-transitory computer readable medium, such as a hard disk drive or other storage medium. Additionally, applications can be in the form of electronic signals modulated in accordance with the application and data communication technology when accessed via a network interface (e.g., transceiver module 430, one or more antennas 435, etc.).

Many other devices and/or subsystems may be connected to, or may be included as, one or more elements of system 400 (e.g., entertainment system, computing device, remote cameras, wireless key fob, wall mounted user interface device, cell radio module, battery, alarm siren, door lock, lighting system, thermostat, home appliance monitor, utility equipment monitor, bed pad sensor, and so on). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and is not discussed in detail in this disclosure. Code to implement the present disclosure may be stored in a non-transitory computer-readable medium such as one or more of system memory 410 or other memory. The operating system provided on I/O controller module 420 may be iOS®, ANDROID®, MS-dOS®, MS-WINDOWS®, OS/2®, UNIX®, LINUX®, or another known operating system.

The components of the apparatus 205-a may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

Figure 5:
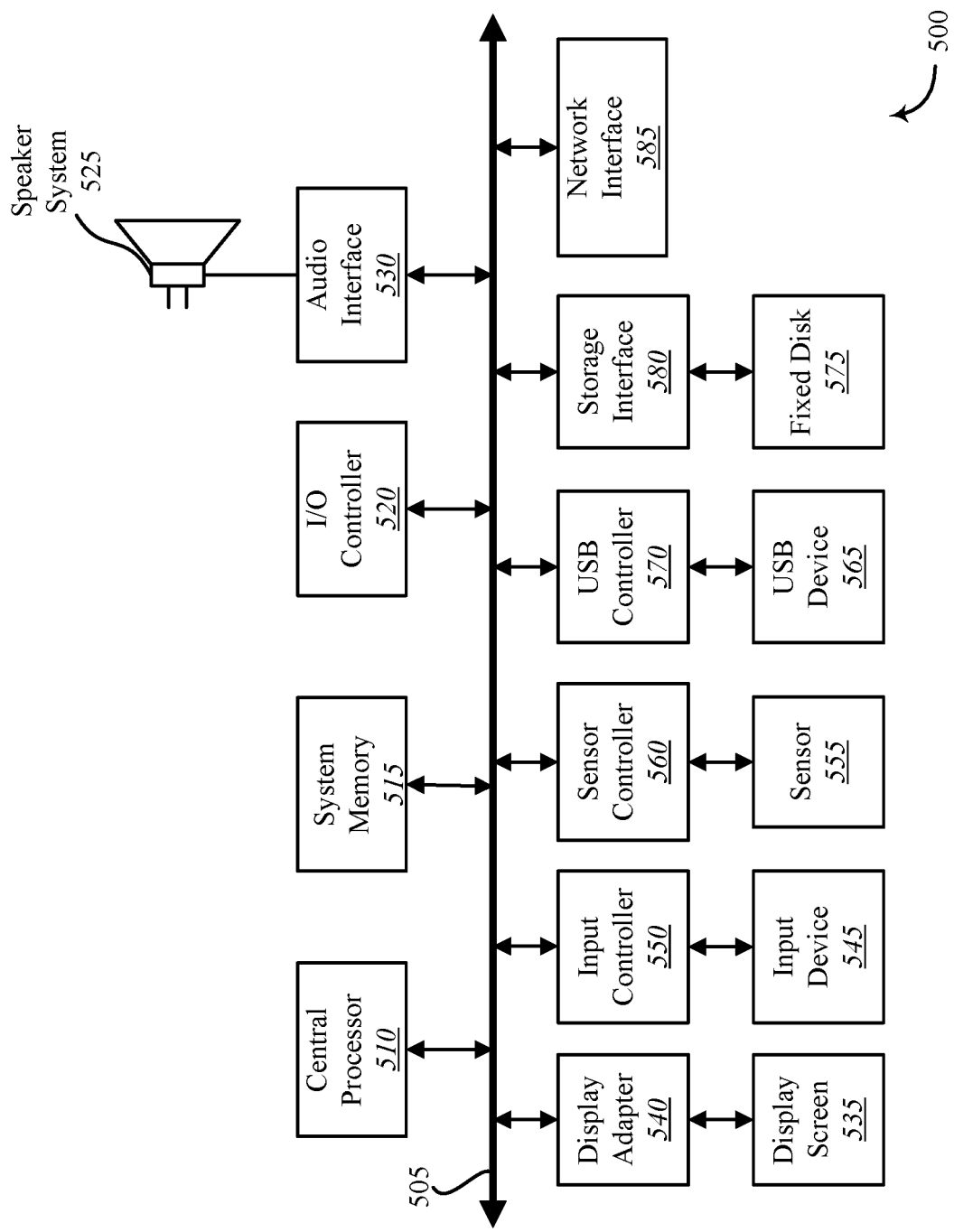
FIG. 5 depicts a block diagram of a computer system suitable for implementing the present systems and methods.

FIG. 5 depicts a block diagram of a controller 500 suitable for implementing the present systems and methods. The controller 500 may be an example of receiver 105 as illustrated in FIG. 1, which may be a set top box device in some examples, or may be a router in other examples. In one configuration, controller 500 includes a bus 505 which interconnects major subsystems of controller 500, such as a central processor 510, a system memory 515 (typically RAM, but which may also include ROM, flash RAM, or the like), an input/output controller 520, an external audio device, such as a speaker system 525 via an audio output interface 530, an external device, such as a display screen 535 via display adapter 540, an input device 545 (e.g., remote control device interfaced with an input controller 550), multiple USB devices 565 (interfaced with a USB controller 570), and a storage interface 580. Also included are at least one sensor 555 connected to bus 505 through a sensor controller 560 and a network interface 585 (coupled directly to bus 505).

Bus 505 allows data communication between central processor 510 and system memory 515, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. Applications resident with controller 500 are generally stored on and accessed via a non-transitory computer readable medium, such as a hard disk drive (e.g., fixed disk 575) or other storage medium. Additionally, applications can be in the form of electronic signals modulated in accordance with the application and data communication technology when accessed via interface 585.

Storage interface 580, as with the other storage interfaces of controller 500, can connect to a standard computer readable medium for storage and/or retrieval of information, such as a fixed disk drive 575. Fixed disk drive 575 may be a part of controller 500 or may be separate and accessed through other interface systems. Network interface 585 may provide a direct connection to a remote server via a direct network link to the Internet via a POP (point of presence). Network interface 585 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 500 wirelessly via network interface 585.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 5 need not be present to practice the present systems and methods. The devices and subsystems can be interconnected in different ways from that shown in FIG. 5. The aspect of some operations of a system such as that shown in FIG. 5 are readily known in the art and are not discussed in detail in this application. Code to implement the present disclosure can be stored in a non-transitory computer-readable medium such as one or more of system memory 515 or fixed disk 575. The operating system provided on controller 500 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 6:
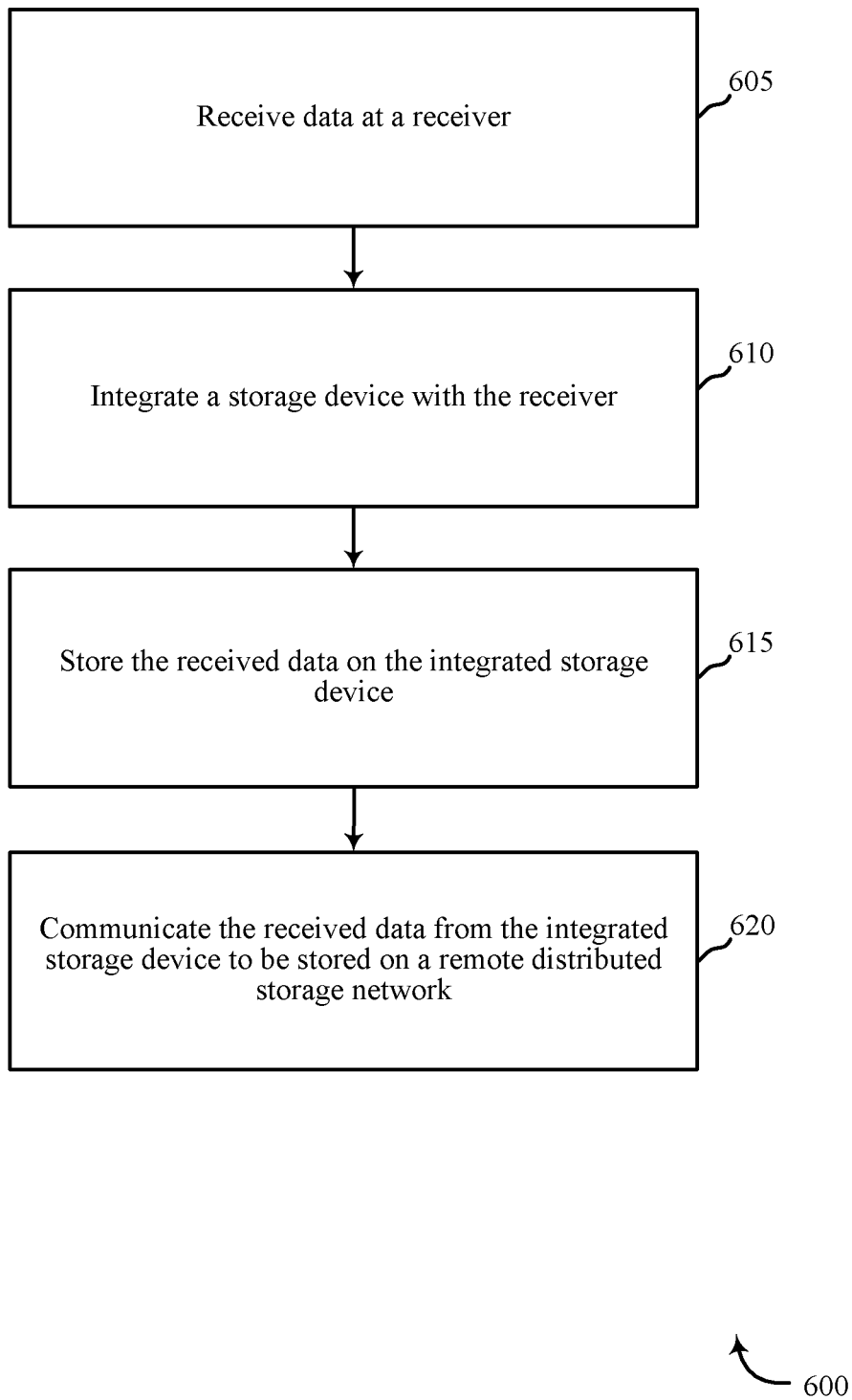
FIG. 6 is a flow chart illustrating an example of a method relating to a secure data storage system, in accordance with various aspects of this disclosure.

FIG. 6 is a flow chart illustrating an example of a method 600 for secure data storage, in accordance with various embodiments. For clarity, the method 600 is described below with reference to aspects of one or more of the receiver 105, storage device 125, network 115, and server 110 described with reference to FIG. 1, and/or aspects of one or more of the apparatus 205, 205-a, described with reference to FIGS. 2 and 4.

At block 605, the method 600 may include receiving data at a receiver. In some examples, the receiver may be an example of a set top box system, while in other examples, the receiver may be an example of a router. Where the receiver is an example of a set top box system, the received data may include user channel preferences or settings, or recorded video. Where the receiver is an example of a router, the received data may include Internet traffic data.

At block 610, the method 600 may include integrating a storage device with the receiver. In some examples, the storage device may include a hard drive or other spinning disk drive, or may include a solid state drive, or any other suitable memory storage device. In some examples, integrating the storage device with the receiver may include manufacturing the receiver to include the storage device as an incorporated component of the receiver. In other examples, integrating the storage device with the receiver may include detachably coupling the storage device with the receiver using a wired connection, such as an Ethernet cable. In still other examples, integrating the storage device with the receiver may include permanently or detachably mechanically coupling the storage device with the receiver after manufacturing, for example by inserting the storage device into a slot in the receiver, or coupling the storage device to the receiver using a docking or plug apparatus.

At block 615, the method 600 may include storing the received data on the integrated storage device. This may include providing any short- or long-term data storage on the spinning disk, solid state, or other storage medium of which the storage device is configured.

At block 620, the method 600 may include communicating the received data from the integrated storage device to be stored on a remote distributed storage network. In some examples, the remote distributed storage network may include a cloud storage network. Data stored on the remote distributed storage network may be accessible by users at any local or remote location, for example using a smartphone or personal computing device. In addition to providing remote access, storage on the remote distributed storage network may allow for secure data storage in the event that the receiver is reset, replaced, unplugged, damaged, or stolen. Thus, copies of the collected data may be stored both locally at the receiver, and remotely at the remote distributed storage network.

Thus, the method 600 may provide for improved secure data storage. It should be noted that the method 600 is just one implementation and that the operations of the method 600 may be rearranged or otherwise modified such that other implementations are possible.

In some examples, aspects from method 600 may be combined and/or separated. It should be noted that the method 600 is just an example implementation, and that the operations of the method 600 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A computer-implemented method for secure data storage, comprising:
    receiving, at a router comprising one or more sensors associated with a security and/or automation system, data packets from a network that are associated with Internet traffic directed through the router, wherein the router is powered by a first power source;
    communicating, from the router to a storage device powered by a second power source independent from the first power source and integrated with the router in a single housing, the data packets received at the router;
    storing the data packets received at the router on the storage device; and
    communicating the data packets received at the router from the storage device to the network, wherein the data packets are stored on a remote distributed storage network.

2. The method of claim 1, wherein the storage device is coupled to the router by at least one of snapping, or plugging, or mechanically attaching the storage device to the router, or any combinations thereof.

3. The method of claim 1, wherein the remote distributed storage network comprises a cloud storage network.

4. The method of claim 1, wherein the one or more sensors comprise one or more of a motion sensor, smoke sensor, glass break sensor, door sensor, window sensor, or carbon monoxide sensor.

5. An apparatus for secure data storage, comprising:
    a processor;
    a router powered by a first power source;
    a storage device integrated with the router in a single housing and powered by a second power source independent from the first power source;

memory in electronic communication with the processor; and instructions stored in the memory, the instructions being executable by the processor to:
- receive, at the router comprising one or more sensors associated with a security and/or automation system, data packets from a network that are associated with Internet traffic directed through the router
- communicate, from the router to the storage device, the data packets received at the router;
- store the data packets received at the router on the storage device; and
- communicate the data packets received at the router from the storage device to the network, wherein the data packets are stored on a remote distributed storage network.

6. The apparatus of claim 5, wherein the storage device is coupled to the router by any of a snap, a plug, or a mechanical attachment, or any combination thereof.

7. The apparatus of claim 5, wherein the remote distributed storage network comprises a cloud storage network.

8. A non-transitory computer-readable medium storing computer-executable code, the code executable by a processor to:
- receive, at a router comprising one or more sensors associated with a security and/or automation system, data packets from a network that are associated with Internet traffic directed through the router, wherein the router is powered by a first power source;
- communicate, from the router to a storage device powered by a second power source independent from the first power source and integrated with the router in a single housing, the data packets received at the router;
- store the data packets received at the router on the storage device; and
- communicate the data packets received at the router from the storage device to the network, wherein the data packets are stored on a remote distributed storage network.

9. The non-transitory computer-readable medium of claim 8, wherein the remote distributed storage network comprises a cloud storage network.

* * * * *